March 28, 1950 — H. OSCAR — 2,502,232
BUILDER'S LEVEL
Filed Feb. 12, 1947 — 3 Sheets-Sheet 1
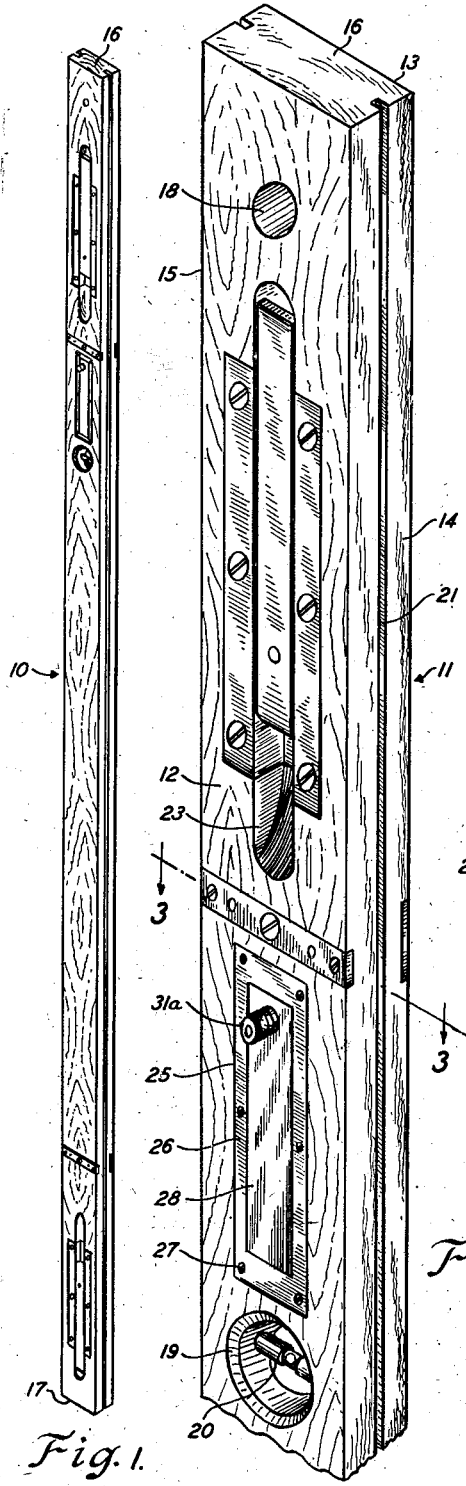
Fig. 1.
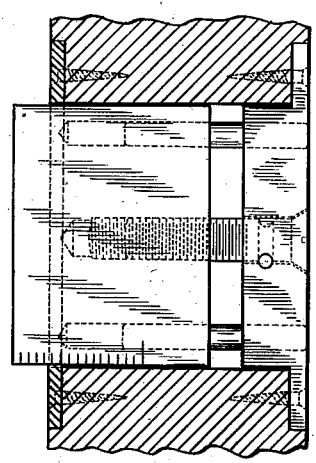
Fig. 11.
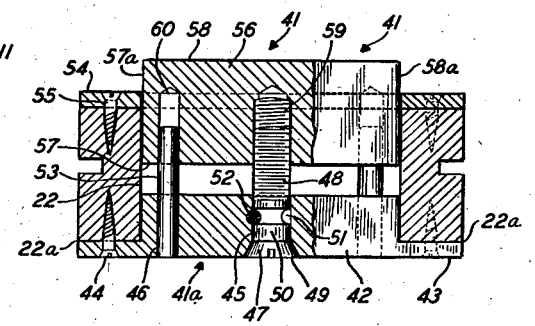
Fig. 3.
Fig. 2.
Inventor
Harry Oscar
J.B. Feldman
Attorney March 28, 1950 H. OSCAR 2,502,232
BUILDER'S LEVEL
Filed Feb. 12, 1947 3 Sheets-Sheet 2

Inventor
Harry Oscar
By J. B. Felshin
Attorney

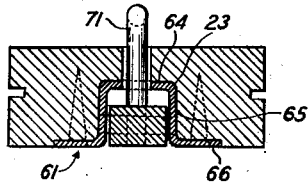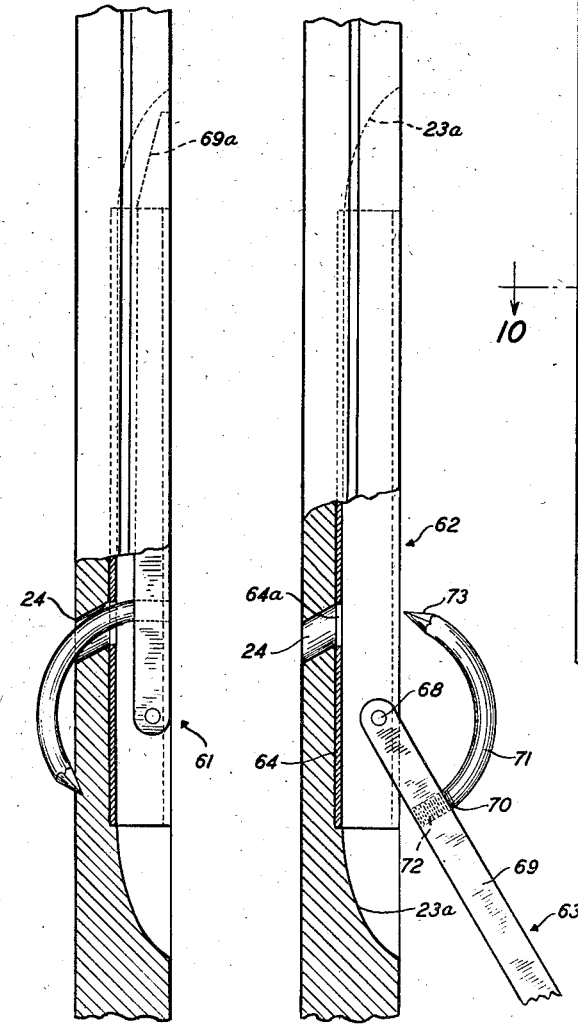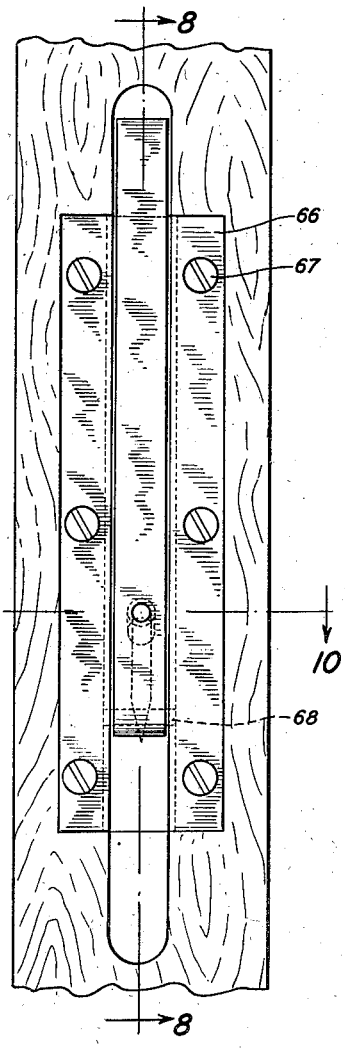

Patented Mar. 28, 1950

2,502,232

UNITED STATES PATENT OFFICE 2,502,232

BUILDER'S LEVEL

Harry Oscar, New York, N. Y.

Application February 12, 1947, Serial No. 728,138

12 Claims. (Cl. 33—207)

This invention relates to builders' levels.

An object of the invention is to provide a builder's level which is particularly adapted for leveling wall or other base surfaces in connection with plastering operations, or the like.

Another object of this invention is to provide, in a device of the character described, an elongated member which has mounted thereon level indicating elements and which is further provided with means for removably securing the device to a wall surface or the like.

Yet another object of this invention is to provide, in a device of the character described, adjustable means for positioning the device with respect to a base surface in combination with level indicating means for leveling the device in planes parallel and normal to said base surface together with means for securing the device to the base surface in leveled position.

Still another object of this invention is to provide in a device of the character described, a level indicating member which is normally mounted flush with a surface of the device but may be pivoted outwardly of said surface, when the device is in use.

Yet a further object of this invention is to provide, in a device of the character described, means for securing the device to a wall surface or the like, wherein the securing means is pivotally mounted on the device in a normally inoperative position but may be moved into an operative securing position when the device has been properly adjusted and leveled with respect to said wall surface or the like.

Other objects of this invention will in part be obvious, and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a perspective view of the builder's level embodying the invention;

Fig. 2 is a perspective view of the details of the upper portion of the builder's level;

Fig. 3 is a cross sectional view on the line 3—3 of Fig. 2;

Fig. 7 is a front plan view of a portion of the level showing the securing means;

Fig. 8 is a cross sectional view on the line 8—8 of Fig. 7;

Fig. 9 is a cross sectional view of the level showing the securing means in a pivoted position preliminary to its movement into an operative position;

Fig. 10 is a cross sectional view taken on the line 10—10 of Fig. 7; and

Fig. 11 is a cross sectional view of a portion of a level embodying the invention and illustrating a modified construction.

Figure 4:
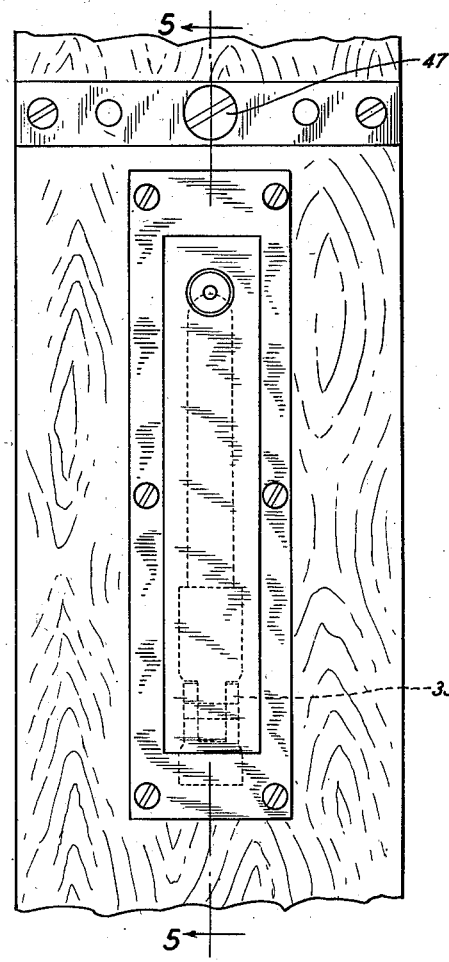
Fig. 4 is a front plan view of a portion of the level.

Referring now in detail to the drawing, 10 designates a builder's level embodying the invention. The same comprises an elongated, generally rectangular member 11 of wood, metal or the like. The member 11 comprises a front face 12, a back face 13 parallel thereto, parallel sides 14, 15 and parallel ends 16, 17. The member 11 is formed at one end thereof with a through opening 18 which extends from front face 12 to back face 13, for the purpose hereinafter described. The member 11 is further formed with a circular through opening 19 spaced from opening 18 and in alignment therewith. Within the opening 19 is mounted a tubular spirit bubble type level indicating element 20, with its axis extending parallel to the faces 12, 13 and at right angles to the sides 14, 15 of the member 11. The member 11 is also formed on each of the sides 14, 15 with a groove 21 which extends longitudinally from end 16 to end 17. The member 11 is further formed with a centrally located, rectangular shaped through opening 22 which lies intermediate the openings 18 and 20. On the face 12 of member 11, adjacent the opening 22 and extending outwardly therefrom are a pair of aligned recesses 22a. Between the opening 22 and 18, the member 11 is formed on its face 12 with an elongated, substantially rectangular shaped recess 23 having upwardly curved end portions 23a from which extends a circular, downwardly inclined, through opening 24, to face 13, for the purpose hereinafter described. Between the openings 22 and 19 the member 11 is formed on its face 12 with an elongated rectangular shaped recess 25 for the purpose hereinafter described.

The member 11 is also formed at its other end with a recess 25, and an opening 22 similar to those described above and located on corresponding portions thereof.

Mounted on the face 12 of member 11 and outlining the recess 25 is a frame member 26 which is secured to the edge portions of the recess by means of screws 27 or the like. Within the frame member 26 and pivotally mounted at the lower end thereof is a cover member 28 for enclosing the recess 25 and which is provided at its upper end with a combination handle and latch 29. The latch 29 comprises a keeper 30 slidably mounted on the inner surface of cover 28 to which is screwed a screw 31 passing through the cover and a knob 31a for moving the keeper into engagement with the upper portion of the frame 26. Within the recess 25 there is secured a fitting 32. The fitting 32 comprises a member 33 comprising ears 33a, which is fixed by means of a screw 34 to an end portion of the recess 25. Pivoted to a pin 33b mounted in ears 33a of member 33 is a projecting portion 35a of a member 35, which is formed with a threaded recess portion 36. A tubular spirit bubble type level indicating element 37 which comprises a threaded shank portion 38, is screwed into the threaded recess portion 36 of the member 35.

Figure 5:
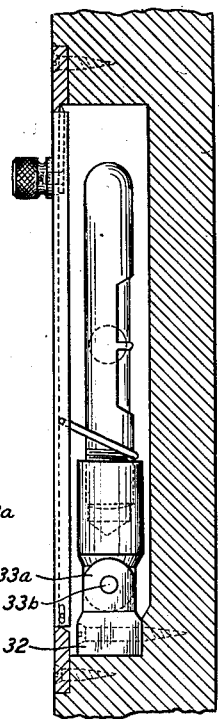
Fig. 5 is a cross sectional view on the line 5—5 of Fig. 4.
Figure 6:
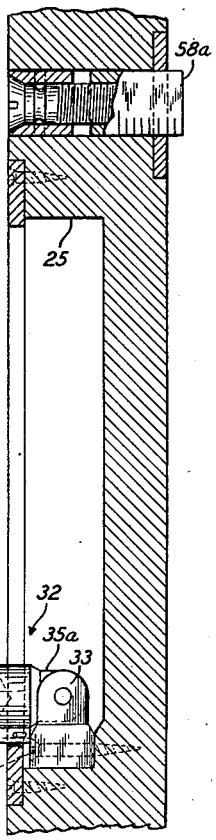
Fig. 6 is a side elevational view of a portion of the level showing the pivoted leveling means in the operative position.

A U-shaped wire member 39 or the like, with outwardly projecting end portions 40 loosely journaled in side portions of the inner face of cover member 28 surrounds a mid portion of the tubular level indicating element 37 in spaced relation thereto. A consideration of Figs. 5 and 6 will indicate how the tubular level indicating element 37 may be brought into an operative position by opening the cover member 28. The pivoted movement of cover 28 will carry with it the pivoting level indicating element 37 by means of the U-shaped member 39, whereby the leveling indicating element 37 will assume a horizontal position as shown in Fig. 6.

Mounted on the face 12 of member 11 over the opening 22 is a positioning means 41 which comprises a fixed member 41a and a movable member 41b. The member 41a comprises a central portion 42 having a thickness less than the thickness of member 11 and received within the opening 22 and projecting side portions 43 received within recesses 22a and extending to the sides 14, 15 of member 11. The member 41a is secured to member 11 by means of screws 44 passing through the side portions 43. The portion 42 is formed with a centrally located through opening 45 and a pair of aligned openings 46, positioned on either side of opening 45. Mounted within the opening 45 is a screw 47 comprising a threaded shank portion 48, a recessed, flat head portion 49 and an intermediate portion 50 formed with an annular recess 51 therein. A pin 52 extends through portion 42 in engaging relationship with the annular recess 51 of the screw 47 whereby the screw is retained for rotatable movement within the opening 45 of the portion 42. In each of the openings 46 there is force fitted an inwardly projecting pin 53. On the face 13 of member and lying flush therewith is an apertured member 54 which frames the opening 22 and is secured to member 11 by screws 55. The movable member 41b comprises a rectangular block 56 comprising parallel plane surfaces 57, 58 and parallel edge portions 57a, 58a, and having dimensions corresponding to those of opening 22. The block 56 is mounted for adjustable movement within the opening 22. The block 56 is formed with a centrally located threaded recess 59 extending from the inner face thereof and positioned to be engaged by screw 47. The block 56 is further formed with a pair of recesses 60 extending inwardly from the face 57 and adapted to receive pins 53 for slidable movement therein. It will be apparent from a consideration of Fig. 3, the block 56 which constitutes a position means may be moved inwardly or outwardly by turning screw 45, the movement of the block being guided by pins 53. The edge 58a of the block 56 may be provided with spaced markings, as shown in Fig. 6 for the purpose hereinafter described.

Mounted within the recess 23 and in conformity therewith is a securing means 61 comprising a fixed member 62 and a pivoted member 63a. The fixed member 62 has a length slightly less than the overall length of the recess and is centrally located therein. The same comprises a bottom wall 64, from which extends a pair of parallel side walls 65 at right angles thereto. Extending outwardly of each wall 65 is a flange 66 which lies flush with the surface 12 of the member 11 and is secured thereto by screws 67 or the like. The bottom wall 64 is formed with a through opening 64a which is in registry with the through opening 24 in the member 11. A transverse pivot pin 68 is mounted between the walls 65 at one end of the member 62. Mounted for pivotal movement on the pin 68 is the member 63 which comprises a rectangular arm 69 fitting between the walls 65 and extending beyond the end of the member 62 to a point just short of the end of the recess 23. The arm 69 has a beveled end portion 69a on the inner surface thereof which constitutes a finger hold. The arm 69 is formed with a threaded opening 70 adjacent the pivoted portion thereof. A curved metal member 71 comprising a threaded shank portion 72 at one end thereof and a pointed portion 73 at the other end thereof, is screwed into the threaded opening 70 in arm 69. The position as well as curvature of member 71 is such as to permit the member to freely pass through the openings 62a, 24 with the pointed portion bearing on the back face 13 of member 11, when the arm 69 is in the position shown in Fig. 8.

The positioning means 41 and the securing means 61 are duplicated on the lower portions of the member 11 as shown in Fig. 1 and include all the corresponding elements as described above.

The device may be suspended on a hook or the like when not in use by means of the opening 18 in the member 11.

In using the builder's level 10, the arms 69 of the securing means 61 are first moved outwardly to the position shown in Fig. 9. The device may then be positioned adjacent a wall or other base surface with the outer surfaces 58 of the blocks 56 in contact therewith and is leveled in planes parallel to the wall by means of the tubular level indicating element 20. The cover 28 is opened thereby exposing the tubular level indicating element 37 which moves with the cover 28. The device is then positioned with respect to the base surface by turning the screws 47 which move the blocks 56 in the appropriate direction until the level indicating element 39 indicates the proper position. When the device has been leveled it is secured to the wall surface by moving the arms 69 inwardly thereby carrying the curved members 71 together with the pointed portion 73 through the openings 64a and 24 in the member 11, into fastening engagement with the wall or other base surface. The curved form of the member 71 is particularly adapted to insure a firm grip with respect to the base surface. The curvature of the member 71 also permits the fastening element to have its pointed portion 73 bear on the rear face of the elongated member 11 when the securing means is not in use thereby avoiding the hazards of an exposed pointed member. While in this position the level may be used as a guide means for plastering trowels and the like such as those disclosed in applicant's copending application, Ser. No. 722,408, filed January 16, 1948. To this end, the trowels described in the copending application may be mounted on the device with portions thereof engageable with the grooves 21 in member 11, thereby permitting slidable movement of such trowels with respect to the device. The device may be removed from the base surface by moving the arms 69 outwardly thereby releasing the curved member 73 from engagement with the base surface.

In Fig. 11 is shown a modified construction wherein the positioning means 41 may be mounted on side portion of member 11 rather than the base 12 as shown in Fig. 2. This permits the level 10 to be used with a side portion thereof adjacent a base surface. In this case, the tubular level indicating element 20 is used to level the device in conjuction with the adjustment of positioning means 41. The tubular level indicating element 37 is used to level the device in directions parallel to the wall or other surface. The parts of the positioning means 41 shown in Fig. 11 are similar to the corresponding parts of the positioning means shown on Fig. 3. The markings on the blocks 56 facilitate the adjustment of the level with respect to a base surface.

It will be apparent that the device embodying the invention disclosed herein may be used as either a builder's level or as a combined level and guide for plastering operations.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In combination, a level comprising an elongated member, level indicating means thereon, adjustable means on said member to position said member relative to a base surface to position said member in level condition as indicated by said indicating means and means on said member to attach said member to said surface in said position said last means comprising a curved penetrating member, pivoted on said elongated member, said penetrating member being adapted to anchor into said base portion upon pivotal movement thereof.

2. In combination, a level comprising an elongated member, level indicating means thereon and means on said member to attach said member to a base surface in a level position relative to said base surface as indicated by said indicating means said last means comprising a curved penetrating member, pivoted on said elongated member, said penetrating member being adapted to anchor into said base portion upon pivotal movement thereof.

3. In combination, a level comprising an elongated member, level indicating means thereon, adjustable means on said member to position said member relative to a base surface to position said member in level condition as indicated by said indicating means and means to attach said member to said surface in said position, said level indicating means being mounted on said elongated member for pivotal movement relative to said elongated member, pivoted means on said elongated member for covering said level indicating means, means on said pivoted means to retain said level indicating means relative to said pivoted means during the movement of said pivoted means whereby movement of said pivoted means relative to said elongated member will impart similar movement to said level indicating means.

4. In a device of the character described, an elongated member, said elongated member being formed with an elongated recess, a cover member hingedly connected on said member and enclosing said recess, level indicating means mounted within said recess, said level indicating means comprising a pivoted supporting member, and a level indicating element mounted on said supporting member, means on said cover member engageable with said level indicating element whereby movement of said cover member will impart related movement to said level indicating element.

5. In a level construction, an elongated member comprising a face portion, said member being formed with a recess on said face portion, a level indicating element pivotally mounted within said recess, a cover member enclosing said recess hingedly mounted on said member and means on an inner portion of said cover encircling said level element in spaced relation thereto, whereby hinged movement of said cover will produce related movement of said level element.

6. In a device of the character described, an elongated member, said elongated member being formed with an elongated recess, a cover member hingedly connected on said member and enclosing said recess, level indicating means mounted within said recess, said level indicating means comprising a pivoted supporting member, and a level indicating element mounted on said supporting member, means on said cover member engagable with said level indicating element whereby movement of said cover member will impart related movement to said level indicating element, said pivoted supporting member comprising a fixed member and a member formed with a socket movably secured to said fixed member, said level element comprising a portion removably received within the socket of said movable member.

7. In combination, a level comprising an elongated member, level indicating means thereon, and hand operated means to attach said member to a base surface in a level position relative to said base surface as indicated by said indicating means, said attaching means comprising, a pivot on said elongated member, a lever member rotatably mounted on said pivot, said lever member comprising an arcuate portion positioned on said member, the axis of said arcuate portion being at said pivot, said arcuate portion being adapted to surroundingly engage a portion of said base surface upon operation of said attaching means.

8. In combination, a level comprising an elongated member, level indicating means on said member, hand operated means on said member to secure said member to a base surface in level position as indicated by said level indicating means, said securing means comprising a lever arm having two ends, one end of which is pivotally mounted on said elongated member, penetrating means mounted on said lever arm intermediate said ends and nearest to said pivoted end, whereby hand movement of the other end of said lever arm will, under mechanical advantage, carry said penetrating means into engaging relationship with said base surface.

9. In a device of the character described comprising an elongated member, said member being formed with through openings on end portions thereof, means on each end portion of said member for securing said member to a base surface, each of said securing means comprising a pivot on said elongated member, a lever member rotatably mounted on said pivot, said lever member comprising an arcuate portion positioned on said member so as to move substantially in the circumference of a circle about said pivot when said lever is operated, said arcuate portion being adapted to pass through said openings in said elongated member and hookingly engage said base surface upon operation of said securing means.

10. In a device of the character described, the combination of an elongated member joined with a through opening on an end portion thereof, and means on an end portion of said member for attaching said member to a base surface, said attaching means comprising a pivot in said elongated member, an arm swingably mounted on said pivot, and a curved penetrating means on said arm, whereby actuation of said arm when attaching said member to said base surface will cause said penetrating means to pass through the opening in said elongated member and hookingly engage said base surface.

11. In combination, a level comprising an elongated member formed with a through opening in an end portion thereof, and means on a surface of said elongated member for attaching said member to a base surface, said attaching means comprising a pivot pin in said elongated member, an arm rotatably mounted on said pivot pin, and a curved hooking member on said arm, the opening in said elongated member being inclined with respect to said surface of the elongated member whereby said hooking member may pass therethrough upon movement of said arm.

12. In combination, a level comprising an elongated member, level indicating means thereon, a longitudinal recess in one side of said elongated member, and means on said member to attach said member to a base surface in a level position relative to said base surface as indicated by said indicating means, said attaching means comprising a lever member pivotally mounted in said longitudinal recess and rotatable thereinto, and penetrating means on said lever member adapted to engage said base portion upon movement of said lever member into said recess, said elongated member being formed with a through opening communicating with the bottom of the recess and said penetrating member projecting through said opening to the other side of said elongated member.

HARRY OSCAR.

REFERENCES CITED

The following references are of record in the file of this patent:

UNITED STATES PATENTS

| Number | Name | Date |
|---|---|---|
| 191,389 | Ward et al. | May 29, 1877 |
| 423,484 | Martin | Mar. 18, 1890 |
| 508,294 | Famous | Nov. 7, 1893 |
| 508,762 | Risse | Nov. 14, 1893 |
| 879,112 | Saegmuller | Feb. 11, 1908 |
| 986,140 | Clarke | Mar. 7, 1911 |
| 1,153,760 | Butler | Sept. 14, 1915 |
| 1,167,237 | Wikberg | Jan. 4, 1916 |
| 1,221,644 | Woods | Apr. 3, 1917 |
| 1,794,254 | Sherwood | Feb. 24, 1931 |
| 2,154,625 | Kleineschay | Apr. 18, 1939 |